United States Patent
Ferguson et al.

(10) Patent No.: US 9,842,178 B2
(45) Date of Patent: Dec. 12, 2017

(54) SYSTEMS AND METHODS FOR BINDING MISMATCHED SCHEMATIC AND LAYOUT DESIGN HIERARCHY

(71) Applicant: CADENCE DESIGN SYSTEMS, INC., San Jose, CA (US)

(72) Inventors: Kenneth Ferguson, Edinburg (GB); Jean-Marc Bourguet, Puget-sur-Argens (FR)

(73) Assignee: Cadence Design Systems, Inc., San Jose, CA (US)

( * ) Notice: Subject to any disclaimer, the term of this patent is extended or adjusted under 35 U.S.C. 154(b) by 118 days.

(21) Appl. No.: 14/981,422

(22) Filed: Dec. 28, 2015

(65) Prior Publication Data

US 2017/0124235 A1 May 4, 2017

Related U.S. Application Data

(60) Provisional application No. 62/248,217, filed on Oct. 29, 2015.

(51) Int. Cl.
*G06F 17/50* (2006.01)
(52) U.S. Cl.
CPC ................ *G06F 17/5027* (2013.01)

(58) Field of Classification Search
CPC .................................................. G06F 17/5027
USPC ........................................................... 716/102
See application file for complete search history.

(56) References Cited

U.S. PATENT DOCUMENTS

| | | | |
|---|---|---|---|
| 2006/0200789 A1* | 9/2006 | Rittman | G06F 17/5068 716/52 |
| 2011/0107281 A1* | 5/2011 | Sun | G06F 17/5081 716/106 |

* cited by examiner

*Primary Examiner* — Suchin Parihar
(74) *Attorney, Agent, or Firm* — Eric L. Sophir; Dentons US LLP

(57) ABSTRACT

Disclosed herein are systems and methods that allow a layout editor function, presented in a graphical user interface, of an EDA, to indicate certain layout instances or "cell views" as "transparent." The instances are indicated as transparent using various layout editor commands or layout designer markers. Unlike conventional solutions, a binder within the layout editor of the EDA is not required to bind layout transparent instances to corresponding instances in a related schematic design file or records. Instead, the EDA may identify non-transparent instances at a lower-level of the layout design's hierarchy to bind, because the systems and methods described herein provide for a transparent instance container at a hierarchically higher-level.

20 Claims, 6 Drawing Sheets

SYSTEMS AND METHODS FOR BINDING MISMATCHED SCHEMATIC AND LAYOUT DESIGN HIERARCHY

CROSS-REFERENCE TO RELATED APPLICATIONS

This application claims priority to U.S. Provisional Patent Application Ser. No. 62/248,217, filed Oct. 29, 2015, which is hereby incorporated by reference in its entirety.

TECHNICAL FIELD

This application relates generally to integrated circuit design and testing systems, methods, and products; sometimes referred to as electrical design emulation.

BACKGROUND

To aid in designing logic systems, engineers may utilize electronic design automation (EDA) software on used to design the layouts for circuit boards and integrated circuits. Both the circuit design and layout design are typically done in a hierarchical manner, building larger designs by creating instances within the larger design which instantiate smaller designs. The EDA software and the design engineers may reference a schematic design and a layout design, to generate corresponding instances (e.g., design elements) in the layout design to counterpart instances in the schematic design. Each instance within a design is an instantiation of another design; typically, instances are hardware circuits, data lanes, or groupings of hardware elements. Each instance in one of the design representations (e.g., schematic design, layout design) has a corresponding database entry containing stores various attributes about the instance. Another key component within an EDA software database is connectivity. Within a design, connectivity specifies how instances are to be connected together within the design, and which connections must be made available on the interface of design. Connectivity is represented in a design by a collection of nets. Each net has a collection of instance terminals, each instance terminal specifies which instance the net connects to and also which terminal (interface port) on the instance the net connects to. To track and "bind" instances between the schematic and layout designs, EDA software may often comprise a binder function ("binder") that tracks, maintains, and updates the correspondences between the schematic and the layout, based on the attributes of the instances. For example, binders may try to match "name" attributes of corresponding instances across design representations, or try to dynamically match any number of other design attributes of the instances, such as the connectivity of the instances.

Although binder engines can typically maintain correspondence among instances residing on the same hierarchical level of the schematic design and layout design, conventional systems are frequently unable to effectively maintain correspondences between hierarchically disparate representations. When an engineer generates additional hierarchical levels in the layout design, the correspondences between schematic instances and layout instances are frequently broken, and, as a result, the user or connectivity driven EDA software may generate unwanted instances at unintended locations, or can delete needed layout instances in error. One reason binders are often unable to maintain correspondences between hierarchically distinct designs is that the binder is unable to infer correspondence between a schematic instance of one type, and a layout instance of another type. So when an original correspondence is between instances of, say, a PMOS circuit, the binder will be unable to maintain the correspondence when the engineer groups five PMOS circuits into a new layout design, because the PMOS circuits were replaced by a new instance for the new design, to which nothing in the schematic design accurately corresponds.

In some cases, a binder may be a name-driven binder. Name-driven binders identify correspondences between schematic instances and layout instances based upon an instance name attribute in a database. A name-driven binder can fail to maintain correspondence due to a name mismatch, which occur when hierarchical layout instance names do not correspond in some computable fashion to the hierarchical name of the schematic instance to which the instance corresponds. Unlike name-driven binders, connectivity driven binders do not require name matches, but instead rely on connectivity matching. Nevertheless, binders can fail to bind corresponding instances when the layout instances required to be bound to schematic instances are relocated into a parent or child instance having no corresponding schematic instance instantiated in the schematic design hierarchy.

FIG. 1 shows several examples of intended correspondences between instances of schematic designs 101 and instances of layout designs 110. As shown, the binder is able to identify correspondences between design instances in a "flat" schematic design 101a and a "flat" layout design 110. In other words, the binder can draw correspondences when there are no additional hierarchies to obscure instances. Frequently the binding engine can also bind instances of a hierarchical schematic design 101b with instances in a flat layout design 110b, though not always.

As described above, complications for the binder typically arise when an engineer generates a hierarchical layout design 110c, 110d. As an example, the binder is not able to bind instances of hierarchical layout 110c with instances of a flat schematic 101c. Likewise, the binder is unable to draw correspondences between instances of a hierarchical schematic 101d and a hierarchical design 110d, when the hierarchies are mismatched. Ultimately, conventional connectivity driven and name-driven binding solutions are often unable to bind instances of a hierarchical layout design 110a, 110d, when the corresponding instances are in a different hierarchical level in the schematic design 101a-d.

When the correspondences between schematic and restructured layouts are lost, then the engineer has effectively lost the ability to make any further, meaningful modifications to the layout design, because the engineer can no longer rely on the binder to verify that the layout design is an accurate rendering of the schematic design. Moreover, automatic connectivity driven layout editors cannot automatically update the layout correctly when bindings have not been correctly computed due to mismatched hierarchy. The layout design is therefore unserviceable as a model for the circuit being designed.

To account for disparate hierarchies, some conventional solutions implement intermediate netlists that logically represent instances of the layout design in a different hierarchical level, to function as a translational file that the binder understands. When instances in the layout design are pushed to a new hierarchical level, the conventional solutions automatically restructure an intermediate netlist to have another design and instances thereof in the intermediate netlist that the binder can tracks and binds to the corresponding instance in the schematic. But tracking and maintaining an intermediate netlist can generate overhead for systems and engineers, as the intermediate netlist must be constantly updated by the connectivity driven layout editor even though it does not represent the actual schematic or the actual layout, and because the system and engineers in some solutions must administer an additional check-in/check-out policy for engineers who may want to manipulate the intermediate netlist directly. Of course, manipulating the intermediate netlist directly may also be problematic because it is a computer-generated abstraction to translate between hierarchical levels, but does not actually map to either a schematic design or layout design. Changes or errors in the intermediate netlist would be difficult to unravel, and would break the correspondences between the instances in the designs. In other words, the intermediate netlists present an unwanted administrative process on the systems and on the people, and also present a single point of error that could damage the design project in progress.

Another conventional solution frequently employed to maintain correspondences are Layout-Versus-Schematic (LVS) software modules. In operation, LVS software can compute bindings between the mismatched schematic and layout hierarchy. However, the LVS software is not typically integrated into the EDA software modules, because the LVS software presents a number of inefficiencies that would disrupt the quality and efficiency of how an EDA tool would function. These inefficiencies are due to the way the LVS software is coded and the way in which the LVS software functions. For example, LVS software products are typically batch checkers, and therefore function in a batch mode, which often require several layers of human-intervention to ensure that the finished layout design matches the schematic design. Consequently, in this example for instance, LVS software cannot be integrated into EDA software, like a connectivity-driven layout editing software, because the LVS software would be too slow for the interactive layout editing to operate in real time. Users would need to make changes and then execute the LVS software to check the entirety of the changes. What is desired, however, is a real-time, human-interactive experience. Moreover, it would be desirable to forgo the need for a separate check altogether, which would require the binder to be capable of analyzing correspondences for instances in disparate hierarchical levels.

What is needed is a means for maintaining the appropriate binding between corresponding instances of schematic and layout designs, regardless of which hierarchical level the corresponding instances reside. What is needed is a means for binding between disparate hierarchical levels, without the need for intermediate netlists.

SUMMARY

Disclosed herein are systems and methods that address the above-discussed shortcomings in the art, and may also provide any number of additional or alternative benefits as well. The embodiments described herein allow layout editor commands presented in a graphical user interface of an EDA layout software, to indicate certain layout instances and/or designs as "transparent." The instances or designs are indicated as transparent using various layout editor commands that modify one or more attributes indicating that a particular design instance or design is transparent. An instance or design may be indicated as transparent through a manual or automatic processes, executed when generating or updating one or more instances in a layout design. The result of marking an instance as being a transparent instance is that one or more attributes for the now-transparent instance are configured in a database to allow the binder of the EDA software to review the attributes of each child instance that a designer or the EDA software relocated into the transparent instance. Unlike conventional solutions, a binder within the layout editor of the EDA software is not required to bind layout transparent instances to corresponding instances in a related schematic design file or records. Instead, the EDA software may identify non-transparent instances at a lower-level of the transparent instance's design's hierarchy to bind, because the systems and methods described herein provide for a transparent instance container at a hierarchically higher-level. If the EDA software identifies another transparent layout instance at a lower-level of the layout design hierarchy, then the EDA is not required to bind the instance to a schematic instance, instead the binder again finds non-transparent instances inside the design master of the transparent instance and attempts to bind these. In other words, the transparency attribute can be multi-level deep in the layout hierarchy and the binder will attempt to bind the leaf (non-transparent) instances within the transparent layout hierarchy. The transparency attributes associated with each layout instance, design or occurrence instance are persistent attributes, stored as attributes in the layout design database.

In one embodiment, a computer-implemented method comprises upon a computer detecting a change to an attribute of a layout instance in a record of the layout instance stored in a design database: identifying, by the computer, one or more attributes of the layout instance in the record of the layout instance, upon determining that a parent instance containing the layout instance is a transparent instance according to one or more attributes of the parent instance in a record of the parent instance; determining, by the computer, a match score indicating a likelihood the layout instance corresponds to a schematic instance, the match score based upon the one or more attributes of the layout instance and one or more attributes of the schematic instance in a record of the schematic instance; and generating, by the computer, a binding attribute in the one or more attributes of the layout instance indicating the layout instance corresponds to the schematic instance, upon determining that the match score satisfies a threshold score. In an alternative embodiment, the parent instance does not have to be transparent for the connectivity binder to run and compute the match score.

In another embodiment, an integrated circuit design system comprises a design database hosted on one or more servers comprising non-transitory machine-readable storage media configured to store one or more records of one or more instances, each respective record of an instance comprising a plurality of attributes; and one or more servers comprising one or more processors executing an electronic design automation (EDA) software application, the EDA software configured to detect a change to an attribute of a record of a layout instance when the layout instance is relocated into a parent instance, and upon determining that the parent instance is a transparent instance: calculate a match score indicating a likelihood the layout instance corresponds to a schematic instance based upon the one or more attributes and one or more attributes of the schematic instance, and generate a binding attribute in the record of the layout instance indicating the layout instance corresponds to the schematic instance upon determining that the match score satisfies a threshold score.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
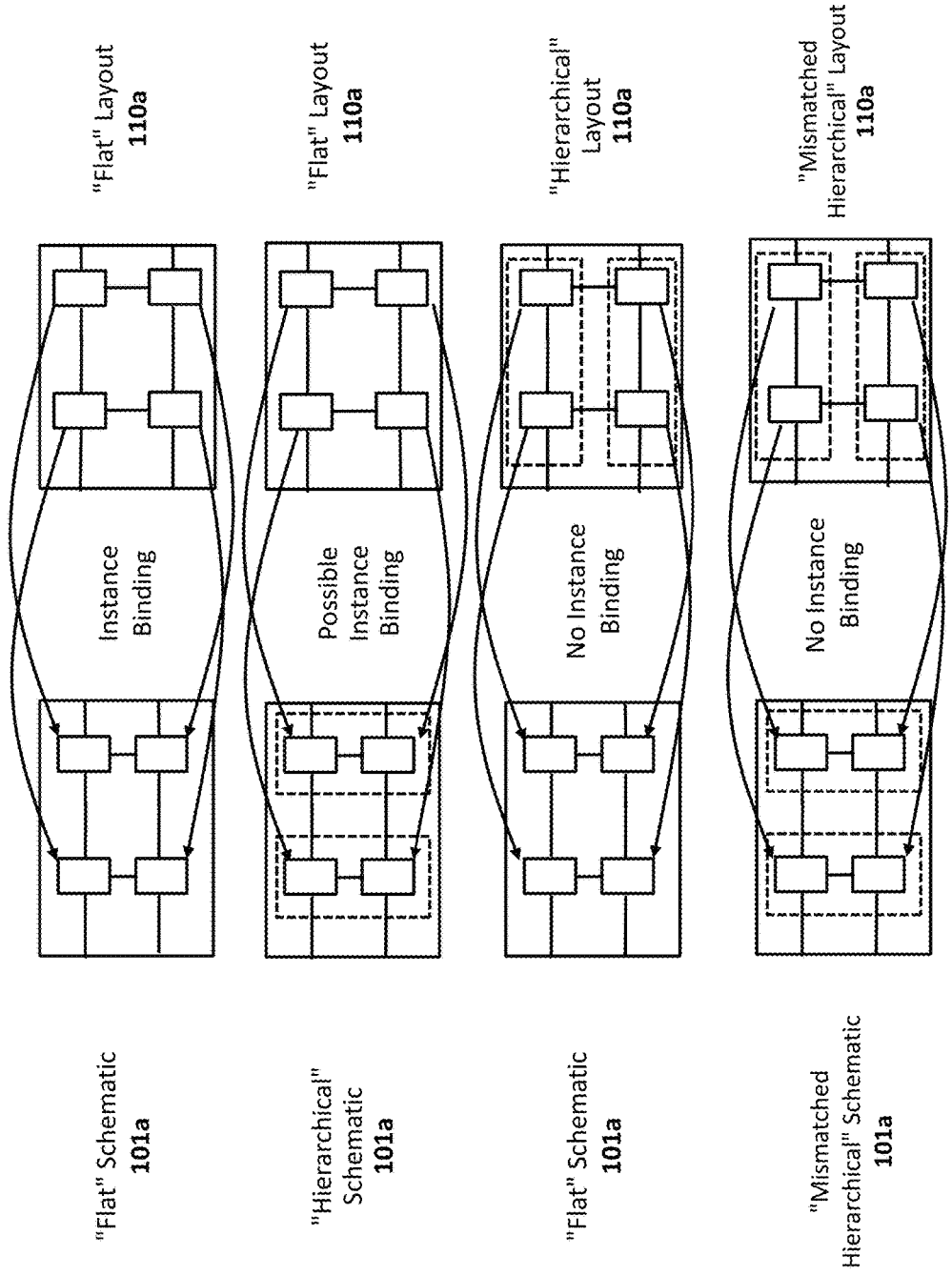
FIG. 1 is a schematic diagram showing various arrangements of schematic and layout instances that may or may not be capable of binding, according to the prior art.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one having ordinary skill in the relevant art and having possession of this disclosure, are to be considered within the scope of the invention.

In the exemplary embodiments described below, manual or automatic updates to attributes of layout instances or layout designs, trigger the various processes for binding and updating correspondences. However, it should be appreciated that binding could also be triggered by a change in the schematic design or schematic instances, since in many cases, engineers update or manipulate the schematic design. As such, changes to either the schematic or the layout may trigger the binder to identify and determine correspondences.

Figure 2:
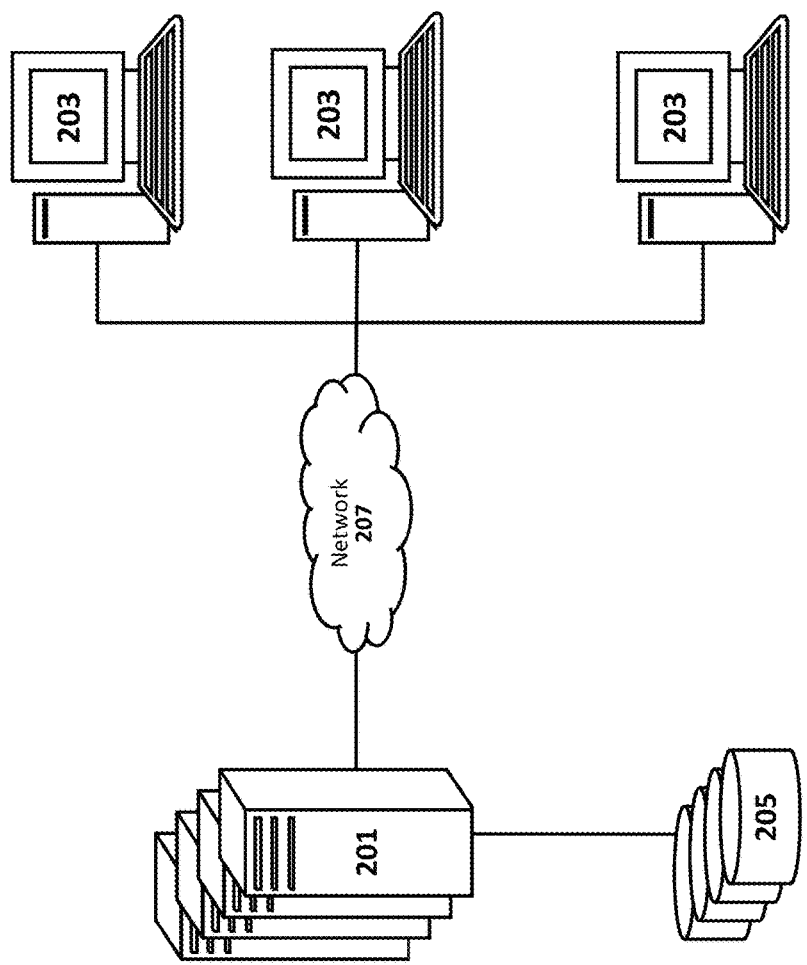
FIG. 2 shows components of an exemplary system for designing and testing designs for logic systems, according to an exemplary embodiment.

FIG. 2 shows components of an exemplary system 200 for designing and testing designs for logic systems, according to an exemplary embodiment. The exemplary system 200 may comprise any number of design servers 201 and any number of design databases 205 that may be accessed by client computers 203 over one or more networks 207. In operation, users (e.g., circuit designers or engineers) may access and operate an Electronic Design Automation ("EDA") software hosted on the design servers 201, to design hardware for various types of logic systems, such as integrated circuits, data lanes, circuit boards, and the like. Non-limiting examples of logic systems may include central processing units (CPUs), graphics processing units (GPUs), application-specific integrated circuits (ASICs), and field-programmable gate arrays (FPGAs), among others.

Design servers 201 may be any computing device comprising a processor configured to host and execute one or more aspects of an Electrical Design Automation (EDA) software that may be accessed and operated by users, such as circuit designers and engineers, to design and model logic systems. In the exemplary system 200, the EDA software is a cloud-based software application, hosted on any number of design servers 201 in a distributed architecture, accessible to client computers 203 over one or more networks 207, such as the Internet or intranet. However, in some embodiments, some or all of the underlying software modules of the EDA software may be downloaded to and installed on the client computer computers 203. Moreover, it should be appreciated that design servers 201 may be any computing device comprising a processor capable of executing one or more tasks or processes described herein. Non-limiting examples of a design server 201 may include a workstation computer, laptop computer, server computer, and tablet device.

A design database 205 may be hosted on one or more server computers comprising non-transitory machine-readable storage media configured to store records of designs and instances, which may be queried and updated by the EDA software executed by the design database 201. In some embodiments, the design database 205 may be hosted on a design server 201; and in some embodiments, the design database 205 may be hosted on distinct computing hardware. It should be appreciated that the system 200 may comprise any number of design databases 205, which may be hosted on any number of server computers. For example, the system 200 may host a plurality of design databases 205 on a plurality of server computers, but may physically and/or logically partition each design database 205 so that each customer's client computers 203 are only able to access the customer's dedicated design database 205.

In operation, the design database 205 may receive schematic designs and layout designs from the design servers 201, as submitted from client computers 203. The records for a schematic design may represent and generate schematic symbols for schematic instances and schematic diagrams. Records for the layout design may represent and generate layout designs at various hierarchical levels, layout instances at various hierarchical levels, and layout diagrams. The records of schematic instances and layout instances may comprise attributes describing that particular instance. The EDA software may query and update these attributes based upon the user-executed commands, while interacting with a graphical user interface representing the instances. That is, in some respects, the EDA software may function as a quasi-WYSIWYG editor for the attributes of the underlying instances stored in the design database 205. As client computers 203 manipulate instances of a layout design using the EDA software, the design server 201 may automatically issue instructions to the design database 205 to update the records of the layout design and layout instances accordingly.

Client computers 203 may be any computing device comprising a processor capable of performing the various processes and instructions described herein. In the exemplary system 200, the client computers 203 are shown remotely accessing a cloud-based EDA software hosted on the design servers 201 over one or more networks 207. However, in some embodiments, the client computers 203 may download and install the one or more portions of the software modules underlying the EDA software, configuring the client computer 203 to execute all or some of the features of the EDA software. Non-limiting examples of client computers 203 may include laptop computers, workstation computers, server computers, table devices, and mobile devices among others.

In operation, a client computer 203 may access, or otherwise execute, the EDA software, to input various instructions related to designing a logic system, and to output user interfaces allowing the user to control execution of the EDA software. As an example, the client computer 203 may upload or otherwise input, to the EDA software, a machine-readable schematic design file. The EDA software may then automatically generate one or more records of the schematic design file, and/or one or more records for a layout design based upon the schematic design file. The EDA software may then generate a user interface that displays an interactive representation of the layout design records. Using the using the client computer 203 to interact with the interactive user interface, the user may manipulate the layout design and instances within the layout design.

In some circumstances, when a user is manipulating layout instances of a layout design, the user may select one or more of the layout instances that the user wants to relocate into a new instances, at lower hierarchical level. The result is that the selected layout instances are made child instances within a new master design or a new parent instance. In operation, the user may run an editor command to form a new layout design containing those selected instances. A new layout design is then instantiated as an instance in the original layout design. In addition, this "new cell" function may update the corresponding database attributes for each of the now-child instances that were relocated into the newly created parent design; the attributes for each child instance now indicate the instance is associated with new parent layout design at a lower hierarchical level. Similarly, the database attributes for the new design indicate that the new design is associated with the associated child instances, which are at the lower hierarchical level. As an example, when an instance is relocated in the layout design hierarchy by EDA software commands (e.g., generating a new cell or flattening hierarchical constructs), then a copy of the relocated instance is created at the new hierarchical location on the graphical interface and in the database. In the case where a new parent design is being generated where the relocated instance was originally located, then the original copy of the instance is deleted from the database—leaving only the copy of the relocated child instance, at the lower hierarchical level.

The new cell generation function may also trigger a binder of the EDA software. A binder may be a set of one or more software modules within the EDA software, configured to logically associate or bind layout instances of the layout design to their corresponding schematic instances in the schematic design. The binder may be configured to dynamically and intelligently track, maintain, and update correspondences between instances of a schematic design and instances of the layout design. In operation, when certain changes are made, like moving instances in the layout to lower levels, the binder may attempt to match instances in the layout design back to corresponding instances in the original schematic design. In order to facilitate binding for instances relocated to a lower hierarchical level within a new block, the particular EDA function generating the new cell may provide the user with the option to mark the hierarchical boundaries as being transparent to the binder, thereby configuring the new block as a transparent instance. As such, the binder may query the instances relocated to the lower-level, within the new child design. Functionally, when a new transparent instance is generated, the binder may still access the attributes of the instances within the new transparent instance, because the EDA software sets an attribute of the new block indicating the new block is a transparent instance, and thus the EDA software allows the binder to query the attributes of the instances within the new child layout design. In other words, the new design does not replace the instances relocated into the new design, as far as the binder is concerned, as the attributes of the new design may be ignored as required, and the attributes of the instances are still identifiable, so the binder can still determine correspondences.

In some embodiments, a brand new instance of an existing layout design can be created or copied into the layout design. The new instance may be created or copied within the top level layout design, or within a parent layout of a transparent instance at any given level of the layout hierarchy. The user can explicitly set the transparency attribute of the new instance, and this then results in the binder attempting to bind as-yet unbound leaf instances in the schematic design hierarchy, to leaf instances within the transparency hierarchy under the master of the new transparent instance.

It should be appreciated that the instantiation of instances and the determination of whether instances should be set as transparent, may be automated and executed by the various software modules of the EDA software. That is, an EDA software editor command can automatically examine each of the layout instances in the layout design hierarchy, and automatically decide which instances to set as transparent and which should not be transparent, in order to achieve best binding match with the schematic design hierarchy.

The system may comprise one or more networks 207, which may comprise any number of computer networking protocols and hardware. Networks 207 may include public networks, such as the Internet, and private networks, such as intranets.

Figure 3A:
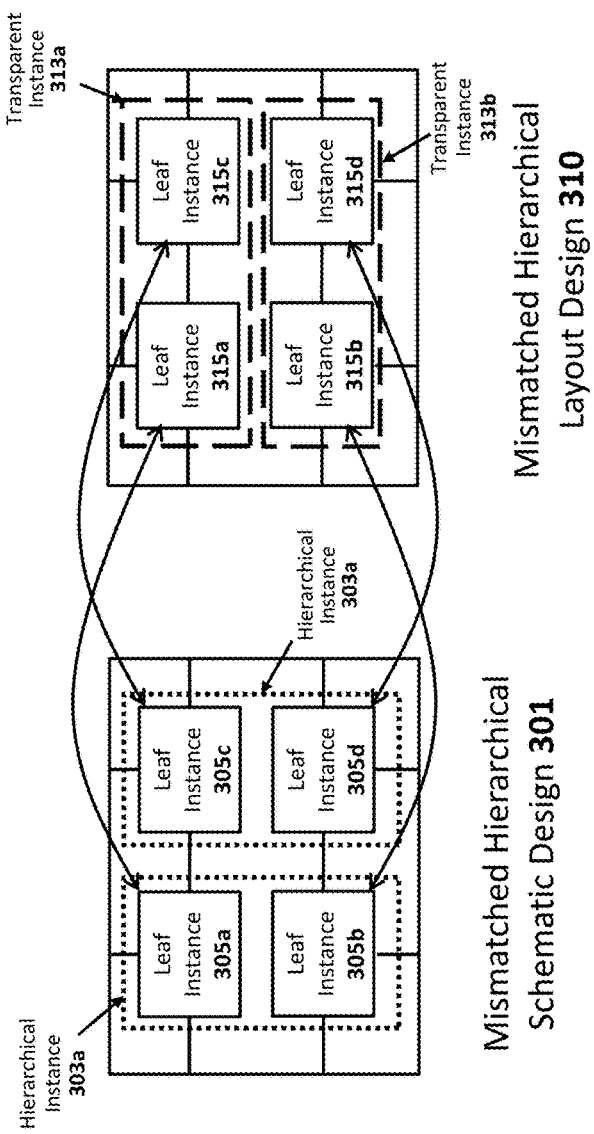
FIG. 3A is a logical representation of binding design elements of designs, according to an exemplary system embodiment.

FIG. 3A is a logical representation of binding design elements of designs, according to an exemplary system embodiment. In this example, the schematic design 301 comprises two hierarchical instances 303a, 303b, each of which contain two leaf instances 305a-d. After generating a layout design 310 based upon the schematic design 301, a user operating an EDA software may manipulate the layout design 310. In the revised layout design 310, the user may generate two new hierarchical instances configured to be transparent (e.g., transparent instances 313a, 313b), and relocate the layout instances 305a-d that should correspond to the schematic leaf instances 315a-d. That is, the user may relocate the layout instances 305a-d corresponding to the schematic leaf instances 305a-d into the two transparent instances 313a, 313b, such that each of the transparent instances 313a, 313b contain two layout leaf instances 315a-d. In conventional systems, such mismatched hierarchical organizations make it impossible for a binder to maintain the binding between the schematic leaf instances 305 and the layout leaf instances 315, because non-transparent hierarchical instances in the layout design 310 replace the layout leaf instances 315 at the particular hierarchical level. Unlike the conventional systems, the effect of the exemplary embodiment is that the layout instances 305a-d could be made child instances of transparent instances 313a, 313b, and still remain visible to the binder. So the binder may maintain the correspondences as needed.

But unlike conventional solutions, a binder in the exemplary system may identify and track correspondences between schematic leaf instances 305 and layout leaf instances 315, even though one or more layout leaf instances 315a-d are relocated to a new hierarchical level. When hierarchical instances are generated or marked as transparent, the attributes of the hierarchical, transparent instances 313a, 313b indicate for the design database that the binder should be able to query the leaf instances 315a-d inside the transparent instances 313a, 313b. The binder may therefore query the attributes of the layout leaf instances 315a-d as well as the attributes of transparent instances 313a-b to identify the corresponding schematic leaf instances 305a-d in the schematic design 310. In the exemplary system, a binder would query the connectivity attributes (e.g., net connectivity) of the layout leaf instances 305a-d and transparent instances 313a-b and compare them with the attributes of schematic instances 303a-b and 305a-d to identify the corresponding schematic leaf instances 315a-d.

Figure 3B:
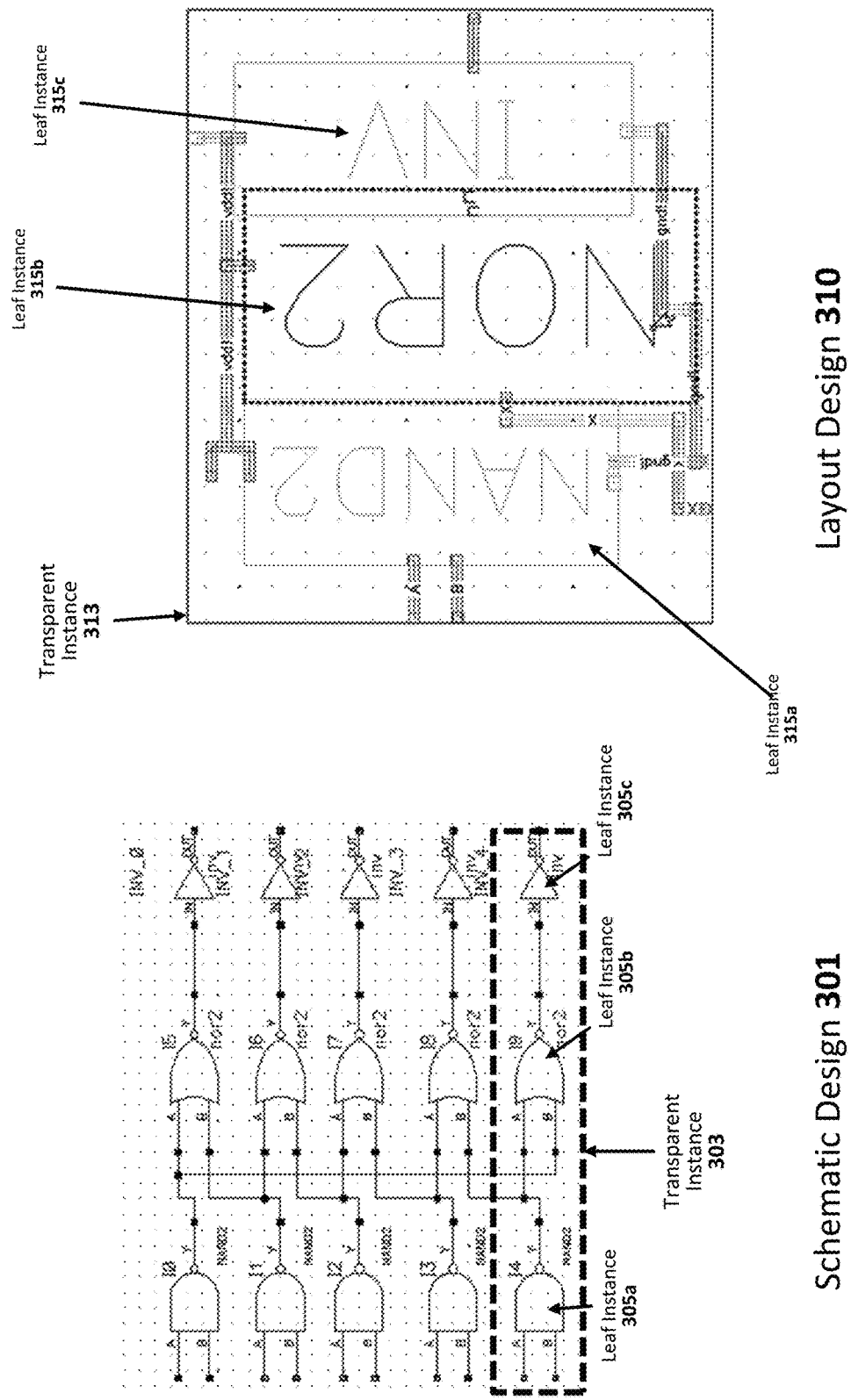
FIG. 3B is a logical representation of binding design elements of designs, according to an exemplary system embodiment.

FIG. 3B shows a schematic design representation 301 and a layout design representation 310 for the design elements of a logic system under development, according to an exemplary system embodiment. In particular, FIG. 3B shows the correspondences between design elements of a schematic design 301 and design elements of a partially complete layout design 310. The schematic design 301 shows a series of groupings of instances 303 that are intended to convey the relationship between the designs 301, 310. Note that the groupings showing in the schematic 301 are for illustration only and do not correspond to any real grouping information stored in the schematic design. The layout design 310, contains a single transparent instance 313 having a parent design that contains the leaf layout instances 315a-c corresponding to the schematic instances in the schematic grouping 303. In operation, an EDA may receive the schematic design 301 and then generate the resulting partial layout design 310, which includes generating the respective records in a design database. In this example, a user may initially generate the leaf instances 315a-c corresponding to the schematic design instances 305a-c, into the layout 310, and then execute a new cell function with instructions to relocate the layout instances 315a-c into the parent design of the new transparent instance 313. Because the transparent instance 313 is indeed transparent, a binder of the EDA software may identify the correspondence between the layout instances 315a-c and schematic instances 305a-c.

Figure 3C:
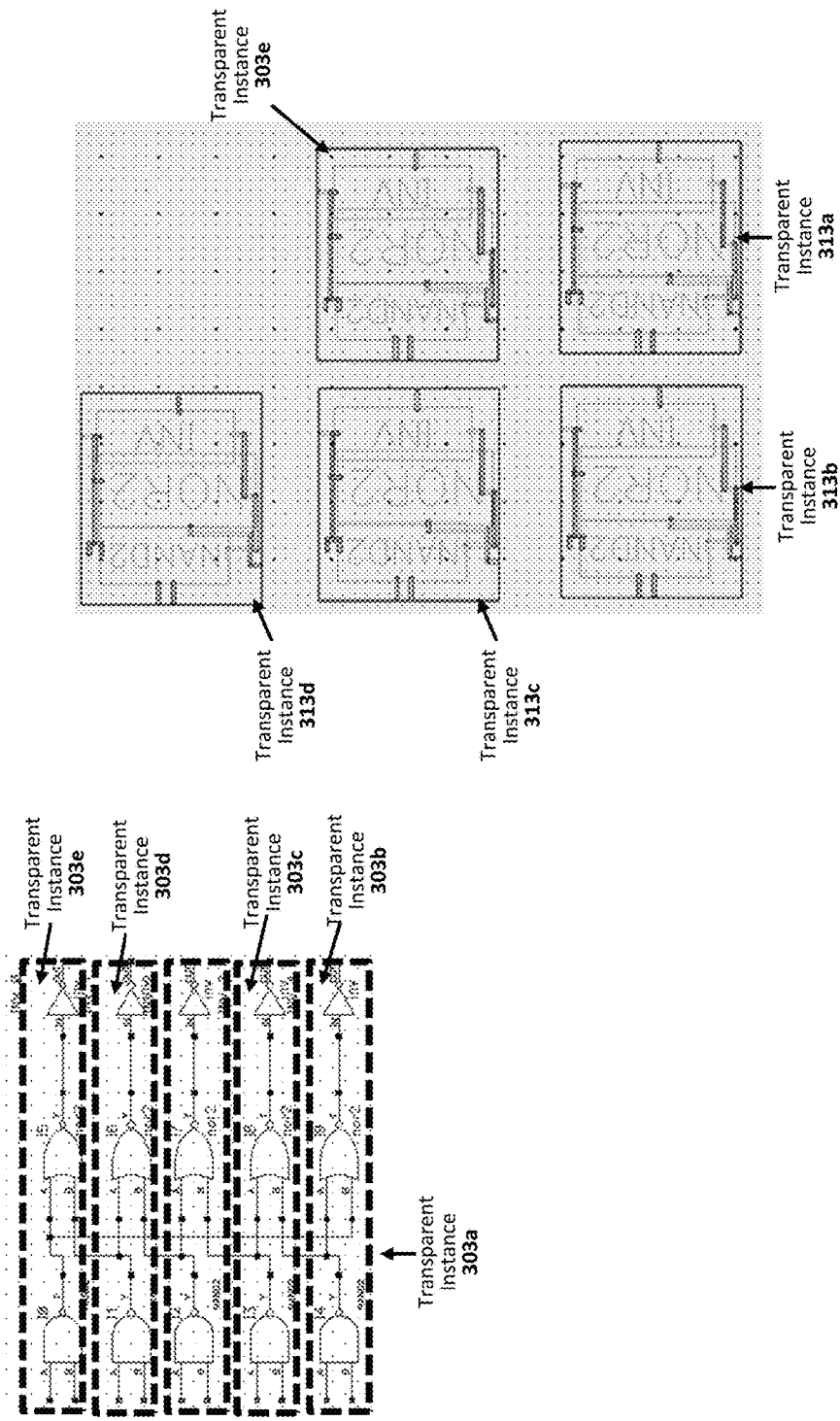
FIG. 3C is a logical representation of binding design elements of designs, according to the exemplary system embodiment of FIG. 3B.

FIG. 3C shows a schematic design representation 301 and a layout design representation 310 for the design elements of a logic system under development, according to an exemplary system embodiment. In particular, FIG. 3C a more complete layout design of the same schematic design 301 shown in FIG. 3B. In this example, the cell view interface shows multiple, cloned transparent instances 313a-e, which correspond to the hierarchical instance groupings 303a-d in the schematic design 301. It should be appreciated that the instance groupings 303a-d shown in the schematic design 301 are for illustration only and do not correspond to any object or attribute in the schematic design.

As described, the EDA software may comprise a user interface that may be displayed on the end-user computing device, to provide an interactive design experience. In many cases, the various inputs or instructions received from the user interfaces are instructions to update the design database, as well as the user interface graphically displaying the user's design choices.

For instance, an available instruction may include a new cell function that graphically generates a new instance in the user interface, and generates a record of the instance in the database. When inputting this instruction, the user may select the instances that will be relocated into the new instance, thereby pushing to the selected instances into a different hierarchical level, within the new instance. The new instance thus becomes a parent instance to the relocated instances. In operation, after a user selects a group of instances in a layout, the EDA software may copy the records of the selected instances into new records, which contain attributes indicating the instances are children to the newly generated layout parent instance (represented graphically as a "cell view"). The EDA software may set either the new layout cell view as transparent, or set the instance of the new cell view as transparent when it is instantiated to replace the original instances in the original cell view hierarchical level in which the new cell function was invoked In some instances, the EDA software may mark an instance, cell view, or occurrence instance, in the layout database as transparent. In some instances, the EDA software automatically identifies when instances cannot be bound due to hierarchical inconsistencies, and may automatically set the one or more attributes of the instance, cell view or occurrence instance, transparency attributes (e.g., transparent, not transparent).

The user may input an copy instruction, requesting the EDA software to generate a copy of an instance. The user perceives that the EDA software has copied, and later pastes, the graphical representation of the instance. However, this instruction produces results in the database. The EDA software copies the record of the instance and the database, and then generates a new record of the instance in the database, having all of the same attributes. In cases where the copied instance is hierarchically higher (and thus contains child instances), the EDA software will generate copies of the records of the child instances. Similarly, where the copied instance is transparent, the EDA software produces resulting copy instances in a same or different transparent cell view, which is also transparent.

The user may input a "save design" instruction, in which the EDA software will save a copy of a instance or design marked as transparent, resulting an a new saved instance or design that is also transparent The user may input an "update binding" instruction, in which the EDA software examines each layout instance, or a user-selected subset of the layout instances, in a given design hierarchy. or a user selected subset of the layout instances in a design hierarchy. In some cases, the EDA software may attempt to automatically modify the transparency attributes of layout instances in order to compute the best-matched bindings to the schematic hierarchy.

In embodiments, the user may input a "manual binding" command that allows the user to select instances within the transparent layout hierarchy that the user wants specify, manually, the binding to the schematic instances in the schematic design hierarchy. In some implementations, the user interface may only present instances within the transparent layout design hierarchy in the manual binding user interface in the layout design interface.

In some embodiments, the EDA software may automatically determine whether bindings are incorrect for layout instances within transparent layout hierarchy. The EDA software may then generate a report or notification indicating the incorrect bindings. Additionally or alternatively, a user may instruct the EDA software to run this Check command. The EDA software will, as a result, report leaf instances within the transparent layout hierarchy that have incorrect bindings or are unbound, or have attribute mismatches as compared the respective corresponding schematic instance. The EDA software may automatically update or otherwise adjust attributes for records of instances, when the EDA software identifies layout mismatches within the transparent hierarchy, by fixing connectivity differences, updating layout instance attributes, deleting unbound layout instances.

Figure 4:
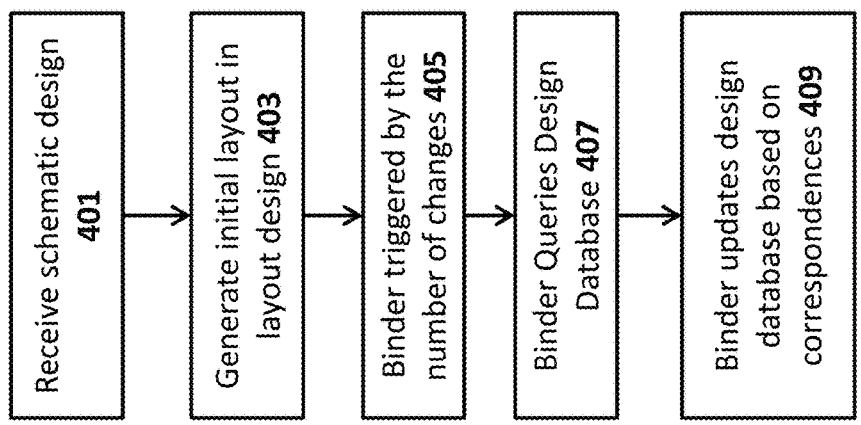
FIG. 4 shows execution of a method for maintaining bindings between corresponding schematic designs and layout designs, according to an exemplary embodiment.

FIG. 4 shows execution of a method 400 for maintaining bindings between corresponding schematic designs and layout designs, according to an exemplary embodiment. The exemplary method 400 shows steps 401, 403, 405, 407, and 409. But it should be appreciated that other embodiments may omit one or more execution steps, or may include additional or alternative execution steps. Although the exemplary method 400 describes execution in an environment where the EDA software is a cloud-based application that is remotely accessed by client computers, it should be appreciated that in some embodiments, one or more software modules of the EDA software may be installed and executed by a client computer.

In a first step 401, a design server may receive a schematic design for a logic system (e.g., CPU, GPU, ASIC, FPGA) currently being designed. The schematic design may be contained on one or more machine-readable data files containing a schematic netlist indicating the schematic design and the design elements (e.g., instances) of the schematic design. Additionally or alternatively, the design elements of the schematic design may be stored within one or more design database records containing the various attributes and features of design elements of the schematic design. In some cases, the design server may receive the schematic design from a client computer; and in some cases, the design server may retrieve the schematic design from the records of a design database.

In a next step 403, the design server may automatically generate a layout design based upon the schematic design. The attributes of the design elements of the schematic design may be stored into a design database. Design elements of schematic designs may be mapped to a layout design based on predetermined mapping rules executed by the design server. For example, the schematic design may have a set of one or more logic gates having a certain shape or characteristics indicating that the logic gates are a certain type of circuit or device. The design server may be preprogrammed to recognize the type of circuit or device based upon the shapes or characteristics in the schematic design. The design server may then populate records of instances for the schematic design based upon the design elements that the design server recognized in the schematic design. In some cases, the design server may receive the records of the schematic design directly, and may therefore not need to recognize the design elements of the schematic design. Based upon the recognized design elements in the schematic design, and/or the records of the schematic design, the design server may be preprogrammed to generate records for a layout design according to the design elements in the schematic design.

In a next step 405, a binder may be triggered to maintain bindings between corresponding instances of the schematic design and the layout design. This step may be automatically triggered after a user makes changes to the design elements (e.g., instances, nets, shapes, wiring) of a layout design, via a graphical interface. When the user updates instances or other design elements, the design server may update the attributes for those updated instances, in the design database. The binder may detect when the attributes are changed beyond a threshold, such as breaking correspondences, moving between hierarchies, changing data lane connections, and others. In this example, the updated attributes of a set of instances indicate that the instances reside at a new hierarchical level, within a new block instance. Moreover, a record of the new block instance may be generated in the database, with attributes indicating that the new block is found at a location where the relocated instances were previously located. As a result of relocating the instances into a hierarchically lower level (within the new block), the bindings are lost between these instances and the corresponding instances in the schematic design. In some cases, the binder detects the broken bindings and is triggered in response.

In a next step 407, after being triggered, the binder may query the design database to identify which modified instances in the layout design correspond to which instances in the schematic design. The binder may query the attributes of the layout design records and the records of the schematic design records, to determine which layout instances correspond to which schematic instances. This determination may be the result of a match score generated by the binder based on any number of criteria that could be used to determine the likelihood that instances correspond. The criteria may be pulled from the attributes in the records of each respective instance; non-limiting examples of criteria may include connectivity criteria such as number of input lanes, input elements, output elements, and type of device, among others.

As an example, the binder identify a change to the attributes indicating the location or hierarchy of a layout instance in the record for the layout instance, causing the binding to break with a corresponding schematic instance. The binder may then query the design database to identify a record of a schematic instance containing attributes that match the attributes in the record of the layout instance. Based on comparisons between the attributes in the record of the layout instance against the attributes in the records of schematic instances, the binder may generate a match score for each schematic instance or each correspondence. The match score may be based on the number of similarities between the attributes of the respective records, and thus the match score indicates the likelihood that the layout instance is intended to correspond to the schematic instance having the best match score. In some cases, the best match score is the match score that exceeds a particular threshold score that indicates the likelihood of correspondence is close enough that it is more likely than not the instance correspond. This threshold may be manipulated by an administrator to determine how sensitive this threshold score should be. In some cases, the binder may execute a comparison between the attributes of the relocated layout instance and each record of a schematic instance in the database, or each record in a subset of schematic instances, such as the record of an instance previously bound to the layout instance. The binder may then determine which comparison indicates the most likely correspondence, which, in some cases, is based on the highest match score.

In some circumstances, the layout instances in the layout design may be on a different hierarchical level than the corresponding schematic instances in the schematic design. In such circumstances, the user or software modules of the layout EDA software may manually or automatically indicate that the parent layout instance, containing those layout instances that need to be bound, is a transparent instance. The binder may then look for correspondences to schematic instances in the schematic design among the leaf layout instances within the transparent instance. In addition, the attributes (e.g., transparency flag) in the record of the new block instance may indicate that the binder may not be required to seek a corresponding instance in the schematic design, for the transparent instance itself. In some embodiments, the design server may be configured to automatically detect when relocated layout instances already bound to corresponding schematic instances in the schematic design, have been pushed to a different hierarchical level within an instance of a new design. In such embodiments, the design server may automatically configure the new design instance created by a "new cell" command, or configure the counterpart of an instance removed by a flatten command, to be a transparent instance and attempt to maintain the same schematic bindings for the relocated instances as they original had prior to being relocated in the layout hierarchy. As previously described, when layout instances are relocated inside a transparent instance, the binder may still attempt to match the attributes of those layout instances with the corresponding schematic instances, regardless of their new and different hierarchical level.

In a next step 409, after the binder identifies the corresponding instances in each of the designs, the binder or other software module executed by the design server may update the attributes of the instance records in the design database. The updates to the attributes may be based on the binder-identified correspondences between the instances. When the attributes indicating the correspondences are updated, the instances are once again bound successfully.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   upon a computer detecting a change to an attribute of a layout instance in a record of the layout instance stored in a design database:
   identifying, by the computer, one or more attributes of the layout instance in the record of the layout instance, upon determining that a parent instance containing the layout instance is a transparent instance according to one or more attributes of the parent instance in a record of the parent instance;

determining, by the computer, a likelihood the layout instance corresponds to a schematic instance based upon the one or more attributes of the layout instance in the record of the layout instance and one or more attributes of the schematic instance stored in a record of the schematic instance; and generating, by the computer, a binding attribute in the one or more attributes of the layout instance indicating the layout instance corresponds to the schematic instance based upon the likelihood.

2. The method according to claim 1, further comprising generating, by the computer, the parent instance at a first hierarchical level according to one or more inputs from a user interface, wherein at least one input configures the one or more attributes of the parent instance as transparent.

3. The method according to claim 2, further comprising generating, by the computer, a copy of the record of the parent instance and a copy of the record of each respective instance relocated into the parent instance, the copy of record of the parent instance containing the one or more attributes indicating the parent instance is transparent, and the one or more attributes of each respective record indicating the respective instance is a child instance of the parent instance and located at a second hierarchical level.

4. The method according to claim 1, wherein determining the likelihood that the layout instance corresponds to the schematic instance further comprises:

determining, by the computer, a match score indicating the likelihood based upon the one or more attributes of the layout instance and one or more attributes of the schematic instance in a record of the schematic instance, wherein the computer generates the binding attribute indicating the layout instance corresponds to the schematic instance upon determining that the match score satisfies a threshold score.

5. The method according to claim 1, further comprising, upon the computer determining that at least one layout instance has been relocated into the parent instance:

updating, by the computer, the one or more attributes of the at least one layout instance to indicate that the at least one layout instance is transparent.

6. The method according to claim 1, further comprising, upon receiving an instruction to generate a copy of the instance from a user interface:

generating, by the computer, a copy of the record of the instance, the copy of the record of the parent instance comprising the one or more attributes indicating the copy of the parent instance is transparent.

7. The method according to claim 1, upon generating the binding attribute in the one or more attributes, further comprising identifying, by the computer, the binding attribute in at least one record of a layout instance incorrectly indicates the layout instance corresponds to the schematic instance.

8. The method according to claim 6, further comprising generating, by the computer, a notification on the graphical user interface indicating that the binding attribute of the at least one record incorrectly indicates the layout instance of the respective record corresponds to the schematic instance.

9. The method according to claim 1, wherein identifying the one or more attributes of the layout instance further comprises: updating, by the computer, the one or more attributes of the parent attribute to indicate the parent instance is transparent, upon determining that the layout instance is relocated into the parent instance and the parent instance is not transparent.

10. The method according to claim 1, further comprising:

receiving, by the computer, an instruction to generate a new record of a layout design comprising the one or more layout instances, and a new record of a new instance of the layout design, the instruction instructing the computer to configure the new instance as transparent; and generating, by the computer, in the design database the new record of the layout design comprising the one or more layout instances; and generating, by the computer, the new record of the new instance of the new layout design, the new record containing one or more attributes indicating the new instance is a transparent instance.

11. An integrated circuit design system comprising:

a design database hosted on one or more servers comprising non-transitory machine-readable storage media configured to store one or more records of one or more instances, each respective record of an instance comprising a plurality of attributes; and one or more servers comprising one or more processors executing an electronic design automation (EDA) software application, the EDA software configured to detect a change to an attribute of a record of a layout instance when the layout instance is relocated into a parent instance, and upon determining that the parent instance is a transparent instance: determine a likelihood the layout instance corresponds to a schematic instance based upon the one or more attributes and one or more attributes of the schematic instance, and generate a binding attribute in the record of the layout instance indicating the layout instance corresponds to the schematic instance based upon the likelihood.

12. The system according to claim 11, further comprising a client computing device comprising a processor configured to transmit one or more interface inputs instructing the EDA software to update at least one attribute of at least one instance in the design database.

13. The system according to claim 11, wherein the EDA software is further configured to generate in the design database a record of the parent instance, the record having the one or more attributes indicating the parent instance is transparent based upon receiving an input from a user interface marking the parent instance as transparent.

14. The system according to claim 11, wherein the design database further stores one or more records of one or more transparent design elements selected from the group consisting of: an instance having one or more attributes indicating the instance is transparent, a cell view having one or more attributes indicating the instance is transparent, and an occurrence instance having attributes indicating the occurrence instance is transparent.

15. The system according to claim 11, wherein the EDA is further configured to calculate a match score indicating the likelihood that the layout instance corresponds to the schematic instance based upon the one or more attributes and the one or more attributes of the schematic instance, wherein the binding attribute is generated upon determining that the match score satisfies a threshold score.

16. The system according to claim 11, further comprising a client computer executing a graphical interface configured to instruct the EDA software to generate at least one attribute for a record of design element indicating the design element is transparent, when the client computer receives via the graphical interface an input marking the design element as transparent.

17. The system according to claim 16, wherein the design element marked as transparent via the graphical interface is selected from the group consisting of: an instance, a cell view, or an occurrence instance.

18. The system according to claim 16, wherein the EDA software is further configured to generate in the design database a copy of each record of each respective layout instance relocated into the parent instance, and generate the one or more attributes in the record of the parent instance indicating the parent instance is transparent according to the marking received from the graphical interface.

19. The system according to claim 11, wherein the EDA software is further configured to automatically generate the one or more attributes of the parent instance indicating the parent instance is transparent.

20. The system according to claim 11, wherein the EDA software is further configured to determine that the binding attribute of at least one record of a layout instance incorrectly indicates that the layout instance corresponds to the schematic instance.

\* \* \* \* \*